Figure 1:
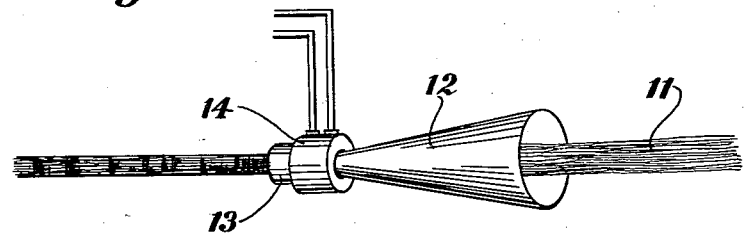

March 5, 1963   P. L. COBB, JR., ET AL   3,079,930
PROCESS AND APPARATUS FOR MANUFACTURING FILTERS
Filed Sept. 22, 1958   2 Sheets-Sheet 1

CORK   CIGARETTE PAPER

FILTER   TOBACCO
SHELL OF
COALESCED FIBERS

Phara Lee Cobb, Jr.
Melvin Rawlings Hargrave
INVENTORS

BY
ATTORNEYS

United States Patent Office 3,079,930
Patented Mar. 5, 1963

3,079,930
PROCESS AND APPARATUS FOR MANUFACTURING FILTERS
Phara L. Cobb, Jr., Kingsport, Tenn., and Melvin R. Hargrave, Croton-on-Hudson, N.Y., assignors to Eastman Kodak Company, Rochester, N.Y., a corporation of New Jersey
Filed Sept. 22, 1958, Ser. No. 762,382
4 Claims. (Cl. 131—208)

The present invention relates to filter elements useful for filtering from tobacco smoke nicotine, tars and the like which are distilled off as vapors or entrained in the smoke from burning tobacco. More particularly, the invention is concerned with unitary rod-like structural elements comprised of cellulose ester and other thermoplastic types of fibers, which elements are suitable for use as cigarette filter tips and as filters for use in pipes and in holders for cigars and cigarettes.

The efficiency of cellulose esters, particularly the cellulose acetates, as a tobacco smoke filtering material has been known for some time. It has been shown that cellulose acetate for instance will remove from tobacco smoke higher percentages of nicotine, tars and the like than will other materials commonly employed for filtering these substances from the smoke. It is also known that cellulose acetate absorbs relatively less of the moisture in the smoke and thereby does not produce harshness by drying the smoke.

Previously it has been suggested to capitalize upon the character of cellulose acetate as a tobacco smoke filter by employing the acetate in the form of an extruded mass of cellulose acetate, e.g., cellulose acetate foam and acetate rod containing longitudinal passages. The suggestion also has been made that spun cellulose acetate is a suitable material for the preparation of filter elements, but so far as we are aware, filters made with spun fibrous filamentary cellulose acetate generally have taken the form of a tube of glass or the like filled with the fibrous material packed in at random. In Berl Patent No. 2,228,383, it is stated that where filters have been made with fibers oriented parallel to each other the filtering efficiency was not good. It appears that the art has failed to produce an oriented fibrous cellulose ester filter element of proper density, diameter and other characteristics required by the tobacco industry which yet preserves and utilizes the superior filtering ability of cellulose acetate.

We have discovered that spun cellulose acetate and polyolefin material comprising elongated strands of fibers substantially longitudinally aligned can be formed into smoke filtering elements of an increased efficiency in accordance with the present invention. We have found a procedure whereby filter elements of the described type having unexpectedly good filtering properties may be prepared. According to our procedure, filter elements are obtainable which have not only good filtering properties but, what is at least equally if not more difficult of achievement, proper character for use with standard cigarette manufacturing and packaging machinery.

Therefore, it is an object of the present invention to form structurally unitary rod-like filter elements of cellulose acetate fibers or modified forms of cellulose acetate and polyolefin types of fibers in which an elongated compact strand of a multiplicity of fibers has its fibers substantially aligned longitudinally of the rod. It is a further object of the present invention to develop a type of cellulose ester filter material which will meet the requirements of the cigarette industry and which in this regard will be suitable for use as a tip material for manufactured cigarettes. A still further object is to provide a unitary elongated rod composed of a multiplicity of yarn-type cellulose acetate fibers primarily oriented longitudinally of the rod, the rod having a suitable size and density for employment as a tobacco smoke filtering element. Another object is to provide a unitary rod-like tobacco smoke filter element composed of polyolefin fibers such as fibers composed of polyethylene or polypropylene.

Still another object of the invention is to provide a filter rod which is self-supporting and requires no extraneous material to serve as a retaining wall. A further object of the invention is to provide a low cost, easily made filter element of a type in which standardization is possible whereby use in present day cigarette manufacturing machines may be had. Another object of the invention is to form a tobacco smoke filtering element from filamentary cellulose ester material comprising a mixture of cellulose acetate and plasticized cellulose acetate. Still another object of the invention is to provide a filter element having suitable porosity, suitable integrity, superior filtering ability, uniform composition, adequate rigidity and resiliency and suited for use in cigarettes, pipes or in holders for cigarettes and cigars. A more specific object is to provide a modified filter in which the fibers have been made to adhere at different points in the fiber mass to provide a consolidated structural unit having an open and porous body, the fibers of which are sufficiently close together to provide filtering activity but not sufficiently close to provide any substantial resistance to the passage of air therethrough. Still another object is a method for manufacturing filters which meets the above-outlined requirements. A further object is to provide a method whereby fibers of the filtering mass are welded both within the interior of and on the surface of the mass in such a way as to provide a consolidated integral structural unit of uniform characteristics. Still another specific object is to provide a tobacco smoke filtering element comprised of cellulose acetate fibers in which the element has a continuous outer shell formed from fused fibers. Other objects will be evident from the following disclosure.

In accordance with our invention, broadly, a tobacco smoke filter element is prepared from fibrous cellulose acetate or a polyolefin such as polyethylene in such a manner that the element comprises a unitary rod-like member having fibers which in the aggregate are parallel but which in short portions of individual fibers may run in random directions. Generically, the filter rods comprise elements of the type described in which the cellulose acetate or other fibers are bonded into a structurally unitary form by means of fusion or coalescence at points of contact. The fusion may be brought about by the action of heat on thermoplastic portions of the fibers. Preferably, a coalescence is caused by partial or incipient solvation of the fibrous material to bring portions of the individual fibers into a condition in which they will flow into similar masses of dissolved or plastic material in the other fibers contiguous thereto. The filters advantageously are formed from a continuous fiber strand which may be either a tow of continuous filament yarn or a sliver of carded staple fiber. Beginning with a strand of fibers, the material is treated to produce tackiness in the surface of at least some of the fibers and is then consolidated by means of a condensing tube or the like through which the strand is run, whereby to bring the fibers firmly into contact with each other and to cause coalescence and adhesion between the fibers as desired.

In accordance with an advantageous specific embodiment of our invention, a filter rod comprised of fibers of cellulose acetate and/or modified, e.g., plasticized cellulose acetate substantially aligned in a longitudinal direction and having an outer shell of fused fibers, with or without welding at points of contact of fibers within the mass, is prepared by a procedure which broadly comprises passing a continuous fiber strand through a condensing tube, subjecting the shaped strand to the action of heat or a solvent or a plasticizer particularly at its surface to cause complete coalescence of the fibers at the outer surface of the condensed strand and thus to form an outer continuous skin or shell surrounding and united to the inner fiber mass. The strand may also be treated if desired within its interior prior to the condensing step whereby to produce welding together of fibers within the condensed bundle. Subsequently, the so-formed and shaped strand is cut into structurally unitary rod-like elements of appropriate length. The term "strand" is used herein to mean tows or slivers of the type described above in which the fibers are substantially oriented along a longitudinal axis.

Figure 2:
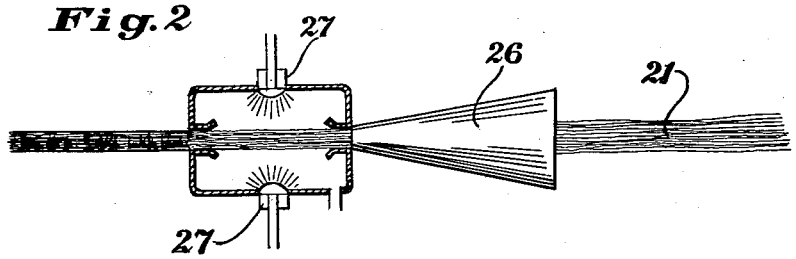
Figure 3:
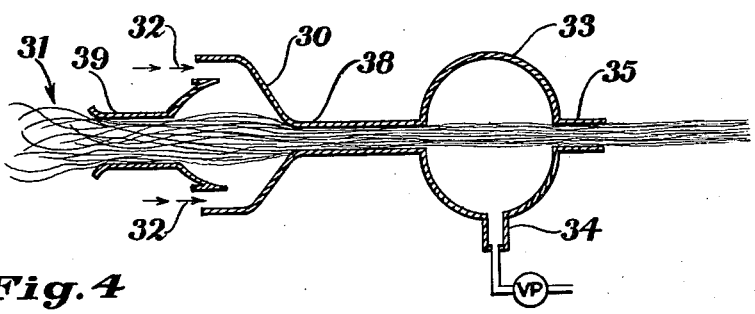
Figure 4:
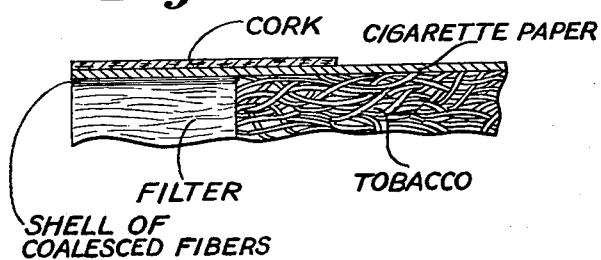
Figure 5:
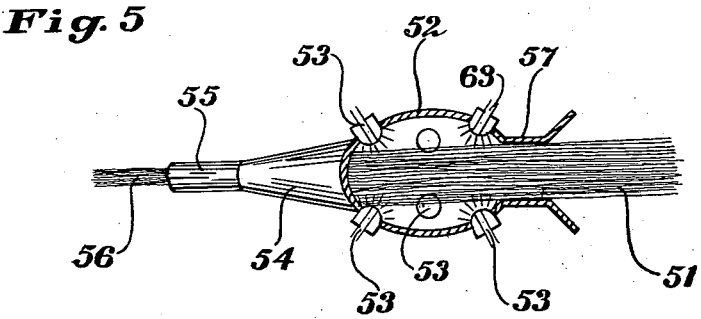
Figure 6:
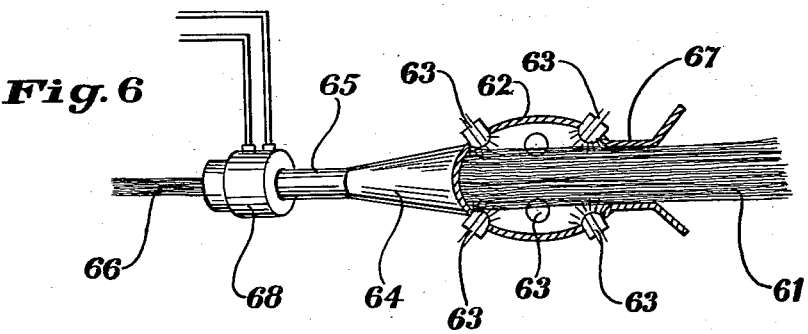

The invention is illustrated in the attached drawings in which:

FIG. 1 is a diagrammatic perspective of a method of forming filter elements in accordance with one specific embodiment of the invention wherein a heated condensing tube is employed to shape a fiber strand and fuse portions of the fibers thereof, FIG. 2 is a diagrammatic illustration, in longitudinal vertical section, of a modification in which liquid chemicals, e.g. plasticizers are employed, rather than heat, to produce fusion within and at the surface of the strand, FIG. 3 illustrates diagrammatically, in longitudinal vertical section, a method of preparing filters in accordance with the invention wherein a heating gas is employed whereby to obtain internal welding between the fibers of a strand, FIG. 4 is an enlarged partial longitudinal section of a filter tip end of a cigarette provided with a filter rod of the invention, FIG. 5 is a diagrammatic illustration, in longitudinal vertical section, of an apparatus and method for preparing filter rods using a plasticizer spray, and, FIG. 6 is a diagrammatic illustration, in longitudinal vertical section, of apparatus similar to that of FIG. 5 with additional means for achieving complete coalescence of and outer skin formation from surface fibers.

With reference to the drawings, two types of apparatus and method for making more or less generic filter rods in accordance with the invention are illustrated in the embodiments of FIGS. 3 and 5. In FIG. 3, a fiber strand 31 containing a suitable percentage of fibers thermoplastic at relatively low temperatures, is passed into a device whereby heat is applied to the fiber mass throughout by means of heated inert gas. It will be observed that the strand 31 in an uncompacted condition is passed through a member 39 which directs the yarn into a confined space defined by the bell shaped portion of the member 39 and a flaring portion of element 30, which latter element in its tapering and constricted portion indicated at 38 constitutes a condensing tube. Within the confined region defined by the relative spacing of elements 39 and 30, the fiber is subjected to a current of highly heated gas such as air, nitrogen, carbon dioxide or the like. The gas is introduced as indicated by the arrows 32 through the annular passageway. Within the confined space the strand still is in a loose and uncompacted condition susceptible to the passage of the heating gas into and through its interstices whereby an even heat is applied both to the surface and within. Thermoplastic portions of the fibers having been brought to a state of fusion, the strand is next passed through the condensing tube portion 38 of suitable transverse section wherein it is condensed and shaped into a desired form and passed thence into a chamber formed by surrounding walls 33 at which point the fibers become somewhat cooled and solidified and the thus treated strand assumes a structurally unitary rod-like condition. A vacuum may be applied to the mouth 34 of the chamber defined by walls 33 whereby all of heating gas may be withdrawn from within the fibrous mass. In passing out of the chamber through exit 35 the fiber rod is further cooled while still maintained under the shape given to it by the condensing tube 38 and from 35 emerges a structurally unitary filter rod of fibers substantially longitudinally aligned and welded to each other at random points throughout the rod. The term "rod" as employed herein signifies a mass which is structurally unitary, or substantially so, and capable independently of substantially retaining its size and shape. The "rods," however, are not usually of rigid character but to the contrary are flexible and resilient.

The apparatus and process of FIG. 3 is, of course, successful where the character of the plasticized fibers obviates the necessity for a temperature sufficiently high to bring all of the fibers or even entire portions of any of the individual fiber to a plastic condition. The fibers may be a blend of plasticized and unplasticized cellulose acetate. A composition of this material has proved most successful for the operation of the process as defined in FIG. 1 also. With further reference to FIG. 3 it should be mentioned that the tapering and confining portion 38 which serves as a condensing tube may be provided with additional heating means such as an electric heating coil whereby complete fusion of the surface of the strand may be assured. It is likewise possible to substitute for the hot gas treating chamber any other suitable apparatus such as a copper tube coil surrounding the path of the strand, the coil being provided on its interior surface with holes serving as jets for the heating gas.

The apparatus and method as illustrated in FIG. 5 is similar to that of FIG. 3 except in the respect that it is based upon use primarily of a liquid plasticizer rather than heat to achieve fiber bonding. A strand 51 of cellulose acetate fiber is illustrated as being passed into a receiving section 57 of a spray treating apparatus. The section 57 serves to confine and regulate the path of the strand but does not exert a substantial compacting effect. Upon leaving the section 57 the strand is subjected to a spray of plasticizer within a spray chamber 52. At this point, as may be observed in the drawing, the strand is in a relatively open and loose form whereby spray from jets 53 positioned at various places within the chamber is directed upon, into, and through the strand and is able to reach all points within the body thereof. The strand moves through the chamber 52 continuously and leaves the chamber by way of a condensing tube 54 which tapers to a final diameter in member 55 which may be approximately ⅕ of the diameter of the strand entering the spray chamber. The effect of the plasticizer is to cause a partial or incipient solvation of the fibers where it contacts them so that during compaction of the fiber mass in member 55 of the spray apparatus, adhesion occurs between adjacent fibers at random points of contact, and the strand is formed into a resulting rod 56 which is structurally unitary as it emerges from the discharge end of the member 55 and more or less retains its size and shape, the fibers being welded permanently to each other at various points throughout the body of the rod.

The apparatus of FIGS. 1 and 2 is particularly designed to provide a modified filter rod in accordance with the invention, and that of FIG. 6 shows the most advantageous process and apparatus. As treated in accordance with FIG. 1, a strand 11 is passed into a tapered condensing tube 12 which is funnel-like in nature and reduces the diameter of the strand to a desired size by transversely, vertically, and obliquely compacting the fibers in a plane perpendicular to the longitudinal axis thereof. The condensing tube has a constant diameter for a short length at its discharge end 13, the portion of constant diameter being heated by means of an electric coil 14 or an equivalent such as a steam coil, dielectric device, etc. The temperature of the heating element and the rate of movement of the strand are so controlled that the surface fibers of the bundle are substantially all heated to the fusion point in passage through the tube whereby they coalesce to form a continuous outer surface covering or skin at the periphery of the rod formed from the fiber strand.

Subsequent to passage through the apparatus of FIG. 1 the resulting filter rod may be passed to a cutting machine (not shown) which chops the continuous cylindrical shell-encased rod into individual filter rod elements of appropriate length. These elements may be employed in cigarette manufacturing machinery of known design capable of fitting and joining the elements to the wrapped tobacco body of cigarettes.

With reference to FIG. 2, the process is generally the same as that illustrated in FIG. 1, with the exception that condensing tube 26 is maintained at room temperature and coalescence of the fibers in the surface regions of the strand is produced by means of a solvent spray projected onto the compacted strand 21 from spray heads 27 positioned at the mouth of the condensing tube. The spray may contain a suitable penetrant such as acetone. The condensed and sprayed strand may, if desired, be subsequently subjected to elevated temperatures in an oven or the like whereby to aid rod formation. It may be preferred to spray solvent onto the fiber strand prior to passage through the tube, or both before and after the condensing operation.

The process and apparatus illustrated in FIG. 6 comprises the preferred embodiment of the invention in the respect that it produces the most advantageous form of filter. The apparatus is like that of FIG. 5 except that a heating element 68 has been added to provide sufficient heat to the surface regions of the condensed strand whereby to cause complete fusion and coalescence of the surface fibers and thereby result in formation of a continuous outer skin or shell. In the apparatus of FIG. 6 a strand 61 is passed into receiving end 67 of a spray chamber 62 and through the chamber, spray being admitted from nozzles 63. By means of condensing tube 64 the strand is formed into the final shape obtained in portion 65 from which it enters the heating element 68. The element 68 is adapted in combination with a predetermined speed of travel of the fiber rod to heat primarily only the surface portions of the rod to a minimum temperature necessary to achieve formation of a continuous outer surface or skin of coalesced fibers.

A satisfactory structure of filter-tipped cigarettes employing filter rod elements of the invention is illustrated in FIG. 4 from which it can be observed that a structurally unitary filter rod having an outer shell of coalesced fibers is joined to a paper wrapped tobacco body by an extension of the paper wrapping of the tobacco. A cork wrapping surrounds and strengthens the joint.

The drawings illustrate the utility of the generic invention and of its various species according to which any one of several types of filter elements may be prepared. In any event the elements all comprise structurally unitary rods of cellulose acetate fibers substantially aligned longitudinally of the rods and having permanent bonds between adjacent fibers at random points. In all forms of the invention fiber bonding to some extent occurs both in the surface regions and in the interior of the fibers. However, the relative degree of bonding of the fibers in the surface area and of those in the interior may be varied in significant amounts whereby to obtain filters of different characteristics. It will be understood from the foregoing that in one of the advantageous modifications the filter rod comprises a structure in which the fibers are contained under some compression by a surrounding shell formed by surface fiber fusion or solvation, with fibers in the interior integrally bonded to the unit.

It will also be understood from the description of the drawings as given above that the essential features of the procedure for preparation of the primarily surface-bonded species embodiment comprise the steps of (1) first forming from a strand of fibers in which the fibers are oriented to lie for the most part in longitudinal parallel relationship, a condensed and more compact fibrous mass having a predetermined transverse section which normally will be circular or oval and (2) treating the thus-formed strand by heat or other means in a manner to solidify or weld the mass into a structurally unitary rod (i.e. a shaped bundle having welded fiber bonds) having said predetermined transverse section. The welding is achieved principally by solvation or fusion of the fibers in the outer surface layers of the condensed strand to produce a continuous relatively smooth surfaced shell. By the term "solvation" as herein employed is meant the creation of an adhesive, tacky, or readily bonding condition by solution or incipient solution of fibers or portions of surfaces thereof. Obviously the continuous lengths of rod can be cut to the desired element lengths and the shape can be varied as regards size and transverse section whereby the elements are adapted for use with various types of cigarettes, holders and pipes and in various types of cigarette manufacturing machinery. It may in some instances be desirable to have a greater degree of internal fusion and welding of fibers than is possible where the heating means comprises an element surrounding the bundle. In such a case it is necessary to supply heat to fibers within the mass without heating the surface fibers to a temperature which is unduly above the melting or solvation (where plasticizer or solvent has been applied) point of the fibers.

In any event, the product formed where treatment is limited largely to surface heating or the action of solvent on fibers at or near the strand surface will consist of a condensed fiber strand compacted within a surrounding skin-like shell, the interior fibers being retained in position within the shell due somewhat to interwelding of the fibers and largely because of compaction and resulting interlocking among the fibers. Filters formed from treatment of the strand primarily internally with heat-gases or plasticizing material as described in the emobidments of FIGS. 3 and 5 will differ somewhat in that the welding which occurs internally of the bundle at random points of contact between the fibers will result in additional unification of the fibers into a single structural element without an outer covering skin. While the amount of internal heating and the amount of fusion produced thereby has a noticeable effect upon the rigidity and resiliency of the finished filter rod, it has been determined that control of these characteristics is obtained largely through variation in the amount of crimp supplied to the fibers which are employed and variation in the number and denier of the fibers. Where the filter produced consists of an outside skin of melted or fused modified cellulose ester fibers and an inside mixture of modified, e.g. plasticized cellulose ester fibers blended with unplasticized fibers with little or no bonding of the fibers of the inside mixture, resiliency is almost a function of the amount of fiber contained within the covering and the accurate control of this amount permits duplication of the exact resiliency which the cigarette has in its tobacco portion. Accurate control in this regard gives a filter which is highly advantageous when employed in usual cigarette manufacturing and packaging machines.

The nature of the rod as controlled by the amount of welding is, of course, determined by variations in the rate of heating and rate of air flow as each of these influences the degree of welding.

The raw material employed in filament or fibrous form may be composed of any one of a number of cellulose derivatives, particularly cellulose esters. Cellulose acetate has proven most advantageous. The preferred material may be any one of several cellulose acetates. Thus it may be a triacetate or a mixed ester such as acetate propionate or acetate butyrate. The most advantageous embodiment of the invention appears to reside in use of a yarn-type cellulose acetate containing 38.8–39.2% acetyl, although the acetyl content per se probably is not critical. A suitable cellulose acetate composition is disclosed in Malm Patent No. 2,097,464. The material employed may be advantageously selected, for example, from a cellulose ester having a propionyl content of 0.6–

1.7% and acetyl content of 38.0–38.7% and a hydroxyl content of 3.89–4.0%. The acetate fibers may contain a suitable plasticizer in varying degrees but, of course, the plasticizer must be non-toxic. Triethyl citrate has proven to be a satisfactory plasticizer and the plasticized acetate fibers employed preferably may contain about 33% by weight of the plasticizer. Other operable plasticizers include tripropionin and N-isopropyl paratoluene sulphonamide. Satisfactory filter rods have been prepared from 100% plasticized yarn-type cellulose acetate fibrous material where the acetate has contained far less, i.e., a minimum of plasticizer. Where a mixture of plasticized and unplasticized fibers is utilized, additional plasticizer may suitably be sprayed onto the surface of the fiber bundle before the bundle passes through the die. As pointed out above, an advantageously suited material is a blended mixture of plasticized and non-plasticized fibers. In this connection the plasticized and non-plasticized fibers may comprise any of the above-identified acetates or mixtures thereof or mixtures of any of these with other fibrous material such as viscose, wool or cotton fibers. The unplasticized and plasticized fiber mixtures have proven far more suitable for shaping and sealing. As non-thermoplastic fibers cotton or viscose may be employed.

Whether the fibers are in the form of continuous filament tows or slivers of carded, cut staple fibers, they may be in either a smooth or a crimped condition, preferably the latter. Card slivers of crimped staple fibers have proven somewhat more advantageous than continuous filament tows. Good filters have been produced from the following raw material mixtures:

I. 50% crimped, cut, plasticized, spun cellulose acetate fibers; 50% crimped, cut, spun cellulose acetate fibers
II. 15% crimped, cut, plasticized, spun cellulose acetate fibers; 85% crimped, cut, spun cellulose acetate fibers
III. 20% plasticized staple fiber of cellulose acetate; 80% unplasticized staple fiber of cellulose acetate
IV. Crimped, cut, spun cellulose acetate containing no plasticized fiber.

The mixtures identified as I and II were treated at temperatures of 220° C. and 230° C., while the material of item IV which contained no plasticized fiber required a temperature of 260° C. Generally cellulose acetate fiber mixtures containing 15–50% plasticized fiber, preferably 20% thereof, will prove satisfactory.

As may be evident from the foregoing disclosure, the fibers can be in any one of several arrangements going through the die. A tow, composed of continuously spun, completely parallel fibers; a tow, composed of continuously spun, crimped fibers and substantially parallel, a part of a lap (from a picker) with completely unoriented cut fibers; card sliver, with partial orientation of the cut fibers; or rovings with various stages of orientation of the cut fibers, are some examples. Thus, while the invention contemplates the use primarily of fiber forms serving to produce a filter rod having fibers substantially longitudinally aligned, the teachings of the invention extend to modifications in which structurally unitary elements with lesser fiber alignment are prepared. The sliver, tow, or the like may be used in any suitable cylindrical or ribbon shape such as normally would be found in material of this nature. Obviously, it is necessary that the sliver not be too bulky for reduction to the desired diameter.

The shaping step, of course, requires that the fibers of the cellulose ester be drawn through the condensing tube by means of a pulling action as opposed to extrusion or forceful feeding into the tube. Thus the melting or fusing of the outside fibers which come in contact with the heated tube surface takes place while the fibers are under some tension. Normally any suitable heated tube having a guiding end of funnel shape and a forming land at its shaping end will be suitable, but preferably the tapered portion of the tube should offer an interior surface which is gradual in its constricting action. The fibers, of course, enter the large end of the funnel and are compressed to approximately the desired filter size as they are pulled through the smaller end. It has been found that generally the strand must be compressed to somewhat less than the desired size in order to compensate for a springing-out action of the fibers when the pressure of the tube no longer confines them.

The tube may be heated by any method such as circulation of a heat exchange fluid, infra-red radiant heating, dielectric heating, etc. For cellulose acetate of the yarn type having an acetyl content in the range of 38–41% temperature limits on the heating tube can be defined as roughly comprising the melting or fusion point of the plasticized or lowest melting point fibers of the acetate at the lower end of the range and the burning point of the fibers at the higher end of the range. Normally the tube heat will be proper if held to a suitable point within the range of 200° C. to 260° C. A 50–50 plasticized-unplasticized mixture treated at 195° C. produced a fuzzy surface indicating incomplete fusion. The same mixture gave a wrinkled surface and exhibited drafting of the fibers at a temperature of 248° C. indicating that too much heat had been applied. While the rate of passage through the tube depends upon a number of factors such as fiber composition, tube temperature, size of the strand and desired product resilience, one skilled in the art will have no difficulty in determining proper conditions for production of the type of product which is required. It may be mentioned that satisfactory filter rods have been prepared at temperatures as above-described from mixtures of plasticized and unplasticized cellulose acetate fibers at forming rates of 1 to 2 linear feet per minute up to 40 feet per minute and more.

Where solvent mist or vapor is applied to the surface of a strand the tube forming the strand into rod shape may be maintained at room temperature. It may be preferred in some instances where vapor treatment is employed to use the procedure illustrated in FIG. 3 whereby penetration of at least some of the vapor to the fibers within the interior of the mass may be had. Thus, vapor treatment may, if desired, be combined with the use of heating gases, and heating gases such as air, nitrogen, carbon dioxide, or steam may contain percentages of solvent or plasticizer vapor. In either event heating of the fibers while in a loose or fluffy form permits the fluid heating medium to penetrate into the interior of the fiber bundle so that on its being subsequently drawn through a tube of smaller diameter, the welding together of heat or solvent softened fibers occurs to a depth and degree which may be controlled by proper selection of conditions. In keeping with one important discovery upon which the present invention is based, i.e., that a properly prepared elongated rod of primarily longitudinally oriented fibers of yarn-type cellulose acetate provides a superior tobacco smoke filtering element, useful filter elements may be prepared with covering shells of paper or of a coated-on film forming material such as cellulose acetate or other cellulose derivative. In the latter alternative, the film-forming material may be applied as a plasticized solution or the like before or after shaping the fiber bundle by means of spraying or dipping.

However, while all of the various above-mentioned modifications fall within the basic concept of the present invention which envisions a unitary structural rod comprising a shell-encased fiber bundle, we have found the most advantageous embodiment to be that wherein the shell is formed by coalescence of the fiber in the surface region of the fiber bundle. Such a structure may, of course, be used in combination with an additional covering of paper if desired, especially where there is only partial or discontinuous skin formation from fusion.

In addition to use as an improved filter for removal from tobacco smoke of tar, nicotine and like components distilled from tobacco, the material of the present invention is suitable for use for filtration of air such as in air conditioning systems. The material may be used likewise for filtration of any number of other gases or liquids. The product furthermore has been found suitable for use as a component of cushions, shock absorbers and packing materials where advantage may be taken of the high resiliency. The material also is useful as absorbent packing. The invention is further illustrated in the following examples:

*Example 1*

A continuously elongated fiber strand of plasticized cellulose ester yarn-type fibers, containing as a pleasant tasting non-toxic plasticizer acetyl triethyl citrate, was passed in sufficient bulk through a condensing tube of circular dimensions equipped with a heating element. The temperature of the tube was held at 225° C. The compressed fibers passing through the tube were pulled along at a rate needed to allow the surface fibers to melt and adhere together, thus forming a thin strong binding surface.

The tube orifice used was approximately 8.4 millimeters in diameter; thus the filter rod formed could be used in the end of regular cigarettes as a smoke filter.

The denier, filament size and number of plasticized fibers used determined the density and the air pressure drop through a specified length of the rod. Tests indicated highly satisfactory characteristics of the filter rods as regards density, pressure drop and filtering ability.

*Example 2*

Regular unplasticized yarn-type cellulose acetate staple fibers were blended on a carding machine with plasticized staple fibers containing 40% triacetin, in the ratio of 70% unplasticized fibers to 30% plasticized fibers. These blended fibers were formed into an elongated sliver of substantially longitudinally aligned fiber and the sliver was passed through a cylindrical condensing tube heated to 250° C. The sliver was compressed and formed into a continuous heat sealed rod which was cut into lengths which subsequently were made into cigarette filter tips by means of a procedure in which the rods were aligned adjacent to the tobacco bodies of cigarettes, the two elements were unified by a single covering of paper, and finally cork tip was wrapped about the filter end of the cigarette.

*Example 3*

In one method of applying this invention, a sliver having substantially longitudinally oriented fibers and consisting of 20 percent plasticized staple fiber and 80 percent unplasticized staple fiber, was drawn through a glass apparatus of the type shown schematically in FIGURE 3.

Air which had been passed through a heated copper coil was introduced at the places indicated in FIGURE 3 and in the enlarged or bulbous part of the apparatus impinged upon the sliver which was being drawn continuously through the apparatus. The sliver whose filaments had been softened by the action of the heated air was then drawn through the constricted portion indicated at 38 in FIGURE 3, and the fibers subsequently in passage through and past the part 35 were cooled below the softening range of the material in which the welding took place. By virtue of the excess pressure of hot air over that of the atmosphere and of the reduced pressure of the vacuum, hot air was drawn through the bundle of fibers in the constricted part, thereby producing a further welding action not only at the periphery of the sliver, but in its interior. The use of a vacuum pump did not, however, appear to be essential. By varying the velocity of the heated air and the rate at which the sliver was drawn through the apparatus, the amount of welding which could be effected was varied at will. With high air velocities and at high air temperatures, with low rate of through-put, the welding action was largely confined to the periphery of the rod. By reducing the rate of air flow, a still lower degree of welding was obtained, so that the resulting rod was quite soft and furry instead of resilient and smooth.

*Example 4*

Another apparatus, very similar to that described above in Example 3 was made. In this apparatus, the bulbous portion into which hot air was admitted was considerably lengthened, and two additional ports for admission of hot air were provided, their centers being in a plane at right angles to that of the first pair of ports. By these means, the length of sliver exposed to heated air was increased, allowing for greater penetration of the heated air, and the use of four ports instead of two provided a more uniform distribution of hot air impinging upon the sliver.

*Example 5*

A third somewhat similar apparatus consisted of a coil of copper tubing which was drilled at frequent intervals on its inner circumference, providing a series of small holes through which hot air issued, and impinged on the loose bundle or sliver which was drawn through the coil. In addition to the coil, a funnel which was made of glass but which could, of course, have been made of metal or other material was provided. The sliver passed from the coil through this funnel, where it was compressed and welded. An electric heating coil on the outside of the stem of the funnel provided heat by means of which the exterior of the fiber bundle was further welded.

When no external heat was used on the stem of the funnel, it was found that a sliver drawn through the intersecting jets of hot air issuing from the coil and through the funel was welded internally but the surface was only very slightly welded. Under the same conditions, except that the funnel stem was heated, the welding took place throughout the sliver.

In the experiments which have been described above, the correct conditions for operation of the various devices and methods were judged on the basis of the nature of the rod issuing from the apparatus, and the rate of heating, rate of air flow, and rate of through-put of sliver could be varied, as has been described above, to increase or decrease the degree of welding.

*Example 6*

A tow of continuous filament, crimped cellulose acetate fibers, without plasticizer, was tried in the apparatus shown in FIGURE 1. At high temperatures considerable welding took place, but decomposition of the cellulose acetate also occurred. However, rods were successfully formed by the use of this arrangement using a tow of lightly plasticized fibers. The use of the tow instead of the sliver has the advantages of greater uniformity and elimination of several steps in manufacture.

*Example 7*

A mixture was prepared using a first component of cellulose acetate yarn-type fiber having maximum crimp and a weight of 5 denier per filament in 2½" staple lengths and a second component of 2½" staple fibers of yarn-type plasticized cellulose acetate having a weight of 5 denier per filament and containing as plasticizer 50 parts of acetyl triethyl citrate per 100 parts of acetate. The mixture of fibers was lubricated with a composition comprising 96% polyoxyethylene sorbitan monolaurate and 4% saccharin. The blended mixture was fed into a picker machine where the mixture was processed into a lap which was then run through a carding machine to produce a card sliver of the blended mixture of plasticized and unplasticized cellulose acetate fibers. The sliver had a weight of 210–230 grains per yarn, which was found to be proper to produce a card which after drafting gave a filter rod of 180–200 grains per yarn. A picker having three beaters was employed in order to produce a lap having a more uniform weight. The continuous sliver from the card was fed into a preheating tube which had a diameter of 1" tapering down to ⅝" over a distance of 16". The tube was heated to a temperature of 220° C. and served to preheat the sliver, giving heat penetration which assisted in forming-down the sliver before the latter reached the die. The preheat also facilitated better control of die temperature. The heated sliver was then pulled into the forming die proper having a land surface. The heat sealing die was fabricated of brass, was 9" in length, and had a 6" tapering length which reduced a ⅞" diameter at its material inlet end to a diameter of 0.339" at the 3" forming land. The land portion of the die was heated to 210° C. by means of immersion heaters with which it was wrapped and it shaped the preheated sliver satisfactorily into a cylindrical rod by melting the plasticized acetate fibers on the surface of the sliver mass and causing coalescence of the surface portion of the mass into a skin or shell surrounding the interior fiber bundle. It was found that the diameter of the fiber rod produced could be within the range of 0.321 and 0.331 inch depending upon the weight of the sliver and the degree of drafting in the rod as it is pulled from the die. Following the die forming step the rod was passed through a 2½" pipe where it was cooled with four jets of air under 40 pounds pressure. Immediate cooling prevented excessive drafting since it resulted in solidification of the melted plasticized fibers. Pull-out rolls at the end of the apparatus pulled the fiber bundle through all of the operations. These rolls consisted of two grooved belts mounted on power driven pulleys, the grooves in the belts being designed to nicely receive the rod. The continuous filter rod subsequently was cut into 66 mm. lengths by cutters mounted at the end of the pull-out rolls and these lengths were employed in standard cigarette manufacturing machinery for the preparation of cigarettes tipped with filters of the invention.

*Example 8*

A filter element was prepared in accordance with procedures outlined above from fine white cellulose acetate fibers. The fibers were disposed lengthwise to form a matted rod having fibers at the periphery thereof bonded by a solvent spray which resulted in formation of a retaining shell. A number of filter elements so prepared were compared with a known type filter element in order to determine comparative physical properties and comparative filtering effectiveness. The results indicated that the filters of the invention have an increased effectiveness in retaining nicotine and tars without adversely affecting the moisture content of the smoke passed by the filter.

As regards the operative weight range for tobacco smoke filtering material conforming to the present invention, it will be appreciated that the number of variables involved dictates a wide possible range of weights. However, it is noted that for heat fused rods of common cigarette diameter composed of blended plasticized and unplasticized yarn-type cellulose acetate and of 66 millimeter length, rods having a weight corresponding to 26–32 rods per ounce gave best results for filling cork cigarette tip wrappers and gave neatest operations in handling with standard cigarette manufacturing machines.

While in the above Examples 1–8, inclusive, we have found it convenient to illustrate our invention by reference to tobacco smoke filters composed of filaments of cellulose acetate or other cellulose esters, our invention is also applicable to the production of such filters from fibers of polyolefins such, for example, as polyethylene and polypropylene. This aspect of our invention will be apparent from the following examples:

*Example 9*

A tow of continuous filament crimped polyethylene fibers was passed in sufficient bulk through a condensing tube of circular dimensions equipped with a heating element. The compressed fibers passing through the tube were pulled along at a rate needed to allow the surface fibers to melt and adhere together, thus forming a thin, strong binding surface. The apparatus is shown in FIGURE 1. The rate of pull-through, the rate of heating, the total denier, denier per filament, the molecular weight-density-melting point of the polyethylene fibers determine the thickness of the binding surface. The tow was 4 denier per filament with a total denier of 35,000. The heated die was used over a range of 100–160° C.

*Example 10*

A tow of continuous filament, crimped polyethylene fibers was passed through a modified apparatus as of FIGURE 3. The hot air chamber was larger and more hot air was available. As with the cellulose acetate fibers, varying the rate and temperature of the hot air enabled the degree of welding to be controlled and also positioned the welding either on the surface or in the interior. The 90 mm. length rod of 24.9 mm. circ. of 4 denier per filament, 35,000 total denier, had a pressure drop of 8 inches of water.

*Example 11*

Using the basic heated air principle as shown in FIGURE 3, a coil of copper tubing was drilled with a series of small holes. The hot air, blown from each hole, was directed towards the center of the coil and onto the tow of continuous filament, crimped polyethylene fibers as it was pulled through the coil and through a heated glass condensing funnel. The tow used was 4 denier per filament and 35,000 total denier. The rate of heating on the air through the coil and the spout of the funnel determined the degree of welding.

*Example 12*

A tow of continuous filament, crimped, polypropylene fibers (4 denier per filament and 35,000 total denier) was used as in Example 9. The die temperature range was 130–190° C.

*Example 13*

The 4 denier per filament, 35,000 total denier, continuous filament, crimped polypropylene tow was passed through the apparatus as described in Example 10.

*Example 14*

The apparatus as described in Example 11 was used to make filter elements from 4 denier per filament, 35,000 total denier, continuous filament, crimped polypropylene tow.

This is a continuation-in-part of our application, Serial No. 324,284, filed December 5, 1952 entitled "Tobacco Smoke Filter Elements and Method for the Preparation Thereof."

We claim:

1. A self-supporting tobacco smoke filter element comprised of a core of aligned crimped cellulose acetate yarn-type filaments arranged in substantially parallel relationship and generally parallel to the axis of the filter, and an annular sheath of cellulose acetate filaments around the core of cellulose acetate filaments, said sheath of cellulose acetate filaments being coalesced to each other throughout their length to form said sheath and also coalesced to the outer layer of core filaments thereby forming a unitary relatively rigid filter element, said element being further characterized in that the cellulose acetate filaments contain a content of plasticizer thereby facilitating the coalescence of the filaments.

2. A product in accordance with claim 1 wherein the cellulose acetate filaments contain a content of triacetin plasticizer.

3. A self-supporting rod-like element adaptable for use as a tobacco smoke filter comprised of a core of aligned crimped continuous cellulose ester filaments arranged in substantially parallel relationship and generally parallel to the axis of the filter, the filaments being essentially comprised of a cellulose ester having a propionyl content of 0.6–1.7%, an acetyl content of 38.0–38.7% and a hydroxyl content of 3.89–4.0%, and an annular sheath of cellulose ester filaments around the core filaments, said sheath of filaments being coalesced to each other at zones along their length to form such sheath and also coalesced to the outer layer of said core filaments thereby giving rigidity to the element, said element being further characterized in that the filaments contain a content of plasticizer thereby facilitating the aforesaid coalescence of filaments.

4. A self-supporting rod-like element adaptable for use as a tobacco smoke filter comprised of a core of crimped continuous cellulose acetate filaments arranged in substantially parallel relationship and generally parallel to the axis of the filter and an annular sheath of the same kind of filaments around the core filaments, said sheath of cellulose acetate filaments being coalesced to other filaments along their length to form such sheath and also coalesced to the outer layer of the core filaments thereby imparting rigidity to the element, said element being further characterized in that at least some of the filaments contain a content of plasticizer up to 40% by weight of the filaments, which plasticizer is adapted to facilitate the aforesaid coalescence of the filaments.

References Cited in the file of this patent

UNITED STATES PATENTS

| | | |
|---|---|---|
| 2,228,383 | Berl | Jan. 14, 1941 |
| 2,476,582 | Browne et al. | July 19, 1949 |
| 2,483,406 | Francis | Oct. 4, 1949 |
| 2,484,003 | Simison | Oct. 4, 1949 |
| 2,612,966 | Nicol | Oct. 7, 1952 |
| 2,688,380 | MacHenry | Sept. 7, 1954 |
| 2,707,308 | Taylor et al. | May 3, 1955 |
| 2,754,829 | Hess | July 17, 1956 |
| 2,789,563 | Taylor et al. | Apr. 23, 1957 |
| 2,794,480 | Crawford et al. | June 4, 1957 |
| 2,805,671 | Hackney et al. | Sept. 10, 1957 |
| 2,813,051 | MacHenry | Nov. 12, 1957 |
| 2,854,059 | Palmer | Sept. 30, 1958 |

FOREIGN PATENTS

| | | |
|---|---|---|
| 121,414 | Australia | Mar. 30, 1944 |

OTHER REFERENCES

The Condensed Chemical Dictionary, Fourth Edition, published 1950 by Reinhold Pub. Corp., N.Y., pages 115, 152 and 669.